United States Patent [19]

Bonnett et al.

[11] Patent Number: 4,900,576
[45] Date of Patent: Feb. 13, 1990

[54] PROCESS FOR PREPARING PARFRIED AND FROZEN POTATO PRODUCTS

[75] Inventors: John H. Bonnett; Thomas H. Cromwell; Rick Norton, all of Twin Falls, Id.

[73] Assignee: Universal Foods Corporation, Milwaukee, Wis.

[21] Appl. No.: 267,255

[22] Filed: Nov. 4, 1988

[51] Int. Cl.⁴ .............................................. A23L 1/217
[52] U.S. Cl. ..................................... 426/438; 426/637
[58] Field of Search ............... 426/438, 441, 637, 524, 426/241

[56] References Cited

U.S. PATENT DOCUMENTS

| 2,597,065 | 5/1952 | Chase. | |
|---|---|---|---|
| 3,355,299 | 11/1967 | McLaughlin et al. . | |
| 3,397,993 | 8/1968 | Strong . | |
| 3,484,252 | 12/1969 | Popeil | 426/438 |
| 3,649,305 | 3/1972 | Wilder . | |
| 3,812,274 | 5/1974 | Weaver et al. | 426/438 |
| 3,881,028 | 4/1975 | Capossela, Jr. et al. | 426/242 |
| 3,934,046 | 1/1976 | Weaver et al. | 426/418 |
| 4,109,020 | 8/1978 | Gorfien et al. | 426/241 |
| 4,219,575 | 8/1980 | Saunders et al. | 426/242 |
| 4,254,153 | 3/1981 | Ross et al. | 426/441 |
| 4,256,777 | 3/1981 | Weaver et al. | 426/637 |
| 4,317,842 | 3/1982 | El-Hag et al. | 426/302 |
| 4,590,080 | 5/1986 | Pinegar | 426/441 |
| 4,632,838 | 12/1986 | Doenges | 426/441 |

FOREIGN PATENT DOCUMENTS 2078081 1/1982 United Kingdom .

Primary Examiner—Arthur L. Corbin
Attorney, Agent, or Firm—Foley & Lardner

[57] ABSTRACT

A process for preparing parfried and frozen potato products and potato products produced thereby, which when reconstituted by finish frying or microwave oven heating have an organoleptic appeal of "fast food chain french fries" potato products. Presliced potatoes are subjected to a first parfrying step, a first freezing step, a thawing step following the first freezing step, a second parfrying step and a second freezing step following the second parfrying step. The frozen potatoes may be reconstituted by microwave heating just prior to consumption.

17 Claims, No Drawings

PROCESS FOR PREPARING PARFRIED AND FROZEN POTATO PRODUCTS

BACKGROUND OF THE INVENTION

1. Field of the Invention

This invention relates to the production of partially fried, frozen potato strips, and more particularly to a process for producing frozen parfried potatoes adapted for reconstitution by any of a number of heating processes, such as deep frying and microwave oven heating.

With the advent of microwave ovens and their versatility in food preparation, it has become important in recent years to provide a means of reconstituting partially fried, frozen foods. It is obviously desirable to provide a food product, such as French fried potato strips, having the organoleptic appeal (including internal and external texture, flavor and final color) of "start-from-scratch" strips made at home or by well-known fast food chains selling "French fries."

A number of solutions have been proposed to improve the crispness and rigidity of parfried potatoes after finish frying. For example, surface treatments of potato strips with various agents including modified starches, gums, alginates, calcium salts, and the like have been prepared. Surface treatment results are successful to a limited degree and vary with the condition of the raw potatoes used. Other procedures have been disclosed in various U.S. patents. For instance, U.S. Pat. No. 3,397,993 discloses a process for producing frozen parfried potato strips, wherein the strips are first blanched to a translucent condition and then dried in hot air (150°–350° F.), thereby removing 20–30% moisture prior to parfrying and freezing. U.S. Pat. No. 3,649,305 discloses a process wherein the potato strips are dried in hot air (150–350° F.) to remove approximately 10–30% moisture, after which the strips were blanched, parfried and frozen.

2. Description of the Prior Art

U.S. Pat. No. 4,254,153 discloses a process, wherein the potato strips are blanched and subjected to a two-stage drying procedure, in which the strips are first exposed to high velocity ambient air for a period sufficient to reduce their weight by about 8–15%. The strips are then dried in circulated heated air to further reduce the weight by an additional 8–15%. After drying, the strips are maintained in a quiescent state for a short period of time to permit equalization of moisture distribution, whereafter the strips are parfried, frozen and packaged.

Other related U.S. patents include Pat. No. 4,317,842 which discloses a process wherein the potatoes are washed, peeled, trimmed, sorted, cut, blanched in a conventional manner, and thereafter starch coated, oil soaked, parfried and frozen. The list of proposed solutions further includes U.S. Pat. No. 3,355,299 directed to a process providing a reconstituted French fried product including a series of six steps, two involving blanching prior to freezing, one comprising freezing, and three (the steps of reconstitution) involving preliminary frying, air cooling, and refrying. This procedure would appear to be directed to institutional preparation since the preliminary frying is done following freezing and storage of a potato product, which has been previously water blanched and oil blanched.

U.S. Pat. No. 4,256,777 discloses a process for preparing an unpeeled potato by cutting the potato into wedge-shaped pieces with a substantially triangular cross-section, cooking or blanching the pieces, parfrying, freezing and packaging. A process for controlling the color of pre-fried potato slices is disclosed in U.S. Pat. No. 3,934,046, wherein raw potato pieces are pre-fried in edible oil for a short period, then leached with water. The leached pieces may be further processed by finish frying or parfrying and refrigerating for distribution.

Potato pieces processed for microwave heat treatment are disclosed in U.S. Pat. No. 3,881,028, wherein the potato pieces are produced by first partially gelatinizing the starch in the pieces of potato without effecting a moisture loss greater than 3%. This is done by means of a microwave heat treatment prior to deep fat frying and heating the pieces to effect a dehydration thereof. The inventors claim the treated pieces to be shelf stable without refrigeration and the potatoes are rehydrated by soaking in water. U.S. Pat. No. 4,219,575 disclosed a complex sinusoidal strip surface configuration for a so-called crinkle cut product which is subjected to a prolonged parfrying step, thereby exhibiting increased crispness when reconstituted by microwave oven treating. U.S. Pat. No. 4,109,020 discloses combined parfrying and drying steps to reduce strip moisture content.

UK patent application GB 2,078,081A discloses a process for preparing frozen French fried potatoes for oven reheating, wherein the potatoes are cut into strips, and the strips blanched, thereafter immersed in oil having a temperature not greater than about 300° F. for a period of time sufficient to attain an increase in solids contents of 3–6%. The strips are first parfried in oil at between 360° F. and 375° F. for a period of time sufficient to attain a moisture content between 60–70% and then removed from the hot oil and subjected to a flow of cool air. The strips are parfried again in oil at a temperature between 340° F. and 375° F. for a period of time sufficient to attain a moisture content of between 55 and 40%. The strips are then frozen for later reconstitution in a conventional oven. An earlier U.S. Pat. No. 2,597,065 disclosed a process for preparing and treating potatoes wherein the potatoes are subjected to a series of steps including conditioning for starch and sugar content, washing, peeling, cutting, blanching, partially drying and packaging for fresh consumption, or quick freezing and packaging. U.S. Pat. No. 3,397,993 disclosed a process, wherein fresh potatoes are peeled, trimmed, cut into elongate segments, blanched with steam to translucency, dehydrated internally and from the surface to a weight loss of up to about 35%, fried for a short time and then frozen prior to finish frying.

Two relatively recent patents disclose processes for preparing frozen potato strips for later reconstitution and finish frying. U.S. Pat. No. 4,632,838 issued to Lamb-Weston, Inc. disclosed a method for making French fried potato strips comprising the steps of peeling and cutting raw potatoes into strips, steaming the strips, drying in ambient air, parfrying, cooling in cold air, parfrying again and then freezing. A disclosed modification of this patented invention includes blanching, cooling in cold air, blanching again, drying in ambient air, parfrying in cold air, parfried and then freezing. U.S. Pat. No. 4,590,080 issued to J. R. Simplot Company discloses a process wherein raw potato strips are first blanched, parfried, promptly frozen, parfried again, directly from the frozen state, and then finally frozen for packaging, storage and later reconstitution and finish frying.

SUMMARY OF THE INVENTION

In accordance with the present invention, there is disclosed an improved process with optimal processing parameters for producing frozen potato product strips, such as French fries and the like, wherein the strips are adapted for reconstitution by finish frying or microwave oven heating. Statistical results of trained taste panelists indicate that the reconstituted product of the present invention has a preferred organoleptic appeal, including internal and external texture, flavor and color.

The process of the present invention includes, in general, cutting potatoes into shoestring strips, crinkle cuts or other shapes known to the art, subjecting the potatoes to the steps of a first parfry, a first freeze, thaw and dry of the parfried frozen potatoes, a second parfry of the previously frozen, thawed potatoes and a final refreeze of the refried potatoes for packaging and storage.

The thawing step, occurring after the first freeze and prior to the second parfry, insures a superior French fried potato when reconstituted. The finished strips exhibit superior taste, color, odor and internal and external textural characteristics.

DETAILED DESCRIPTION OF THE PREFERRED EMBODIMENT

The present invention relates to a process for preparing parfried and frozen potato products for reconstitution prior to consumption. Although the invention is applicable to a number of finish heating processes, it has particular application to microwave oven reconstitution.

More specifically, the preparation process of the present invention provides certain of the advantages of the Pinegar U.S. Pat. No. 4,590,080 wherein two parfrying steps are employed, with a first freezing step introduced between the first and second parfry stages. In Pinegar, the potatoes are parfried directly following the first freezing step.

PROCEDURE

Samples of the present invention submitted to the test panel were prepared by the following procedural steps:

1. The potatoes used were of the well-known Russet Burbank type subjected to standard harvesting procedures.
2. Sorting and Sizing—standard potato sorting and sizing techniques were used.
3. Cutting—conventional potato cuts were made, i.e. shoestring, straight cuts and crinkle cuts. The cutting apparatus is standard to the potato processing industry, i.e. water knives/Urschel cutters, etc.
4. Blanching—the potatoes were immersion blanched in water for 16 minutes at 170° F. Multiple blanchers or steam blanching are acceptable. However, the immersion blanch is preferable because of the greater uniformity in texture control.
5. Sugar Dip or Flume—The cut potato strips were subjected to a sugar flume at 0.6° brix at 168° F. for 20-25 second residence time.
6. First parfry—This parfry, in edible cooking oil, took place at 375° F. for 75 seconds.
7. Freeze—First freeze step—quick freeze of 20 minutes at −30° F. The potatoes were maintained at 0° F. for a period of up to six months prior to finished processing.
8. Thaw—previously cut, first-parfried, frozen potatoes were thawed via an air dryer at 170° F. for four and a half minutes with a bed face air velocity of 450 feet per minute and bed depth of 2 inches. The internal temperature of the strips was measured after thawing at between 37° F. and 40° F.
9. Second-parfry—The previously first-parfried, frozen and thawed potato strips were refried (second-parfry) at 370° F. for 180 seconds.
10. Final freeze—The second-parfried potatoes were subjected to a quick freeze of 20 minutes at −30° F. The potatoes were stored in this state at 0° F. until reconstituted.

RANGE CONDITIONS

The parameters of each of the various processing steps of the procedure outlined above, in comparison with the preferred or optimum embodiment, were varied as follows with acceptable results:

(a) Blanching—A blanching range of 12-25 minutes at 163° F.-180° F. was found to be acceptable depending on cross sectional area of the potato strip. An immersion blanch is preferred, although steam blanching between 185° F. and 205° F. for 8-15 minutes is also acceptable.

(b) Sugar Dip or Flume—An acceptable range for the sugar flume was found to be 0.2° brix to 1.2° brix at from 110° F. to 180° F. for 10-50 seconds.

(c) First parfry—A first parfry range of 40 seconds to 120 seconds at 360° F.-385° F. was found acceptable.

(d) Freeze—A quick freeze of 7-30 minutes at −20° F. to 45° F. provided acceptable product.

(e) Thaw—The thawing parameters found to be acceptable were 140° F.-200° F. via an air dryer for 3-6 minutes with a bed face air velocity of 300-500 feet per minute and a bed depth of 1-4 inches. The internal temperature of the potato strips, after thaw, measured 33°-45° F.

(f) Second-parfry—The second-parfry range is 360° F.-385° F. for 120-240 seconds.

(g) Final freeze—An acceptable quick freeze range is 7-30 minutes at −20° F. to −45° F.

Introduction of the thawing step following the first freeze and prior to the second parfry also provides very favorable thermodynamic results. Previously frozen (10° F.) French fry strips of the prior art require 550 BTU/lb. for the second-parfry stage, as opposed to 395 BTU/lb. utilizing the thawing step of this invention. Thus, from a manufacturing economy standpoint, production volume may be theoretically increased through the fryer by 28% when the French fries have been previously thawed compared to directly subjecting frozen strips to the second parfry step.

An additional organoleptic enhancement resulted during microwave reconstitution using a flexible packaging substrate, i.e. Kraft paperboard laminated with polyesters, with a metal susceptor plate, such as that known to be useful for microwave popcorn. The susceptor plate is known in the packaging industry as metalized polyester laminates.

EVALUATION

As is generally the practice in evaluation of reconstituted potato strips, a panel of six trained taste analysts evaluated various samples of French fry potato strips reconstituted and heated in a microwave oven under various conditions.

A breakdown of the treatment processing parameters and the wet chemistry results for thermodynamic/solid-/oil testing of comparative samples of both "thawed prior to second fry" strips of present invention (hereinafter, "Prethawed") and of strips fried directly following freezing (hereinafter "Prefrozen"follows. The products were each held from 30 to 240 seconds in the second parfry at 375° F. The control batch was produced using a water blanch at 170° F. for 16 minutes, first-parfry at 370° F. for 75 seconds and frozen. All subsequent samples were obtained from the control batch. The control batch first parfry moisture and oil content were 69.75% and 5.89%, respectively.

TABLE A

| Treatment Identifier | Air Dryer Thawed Yes | No | 2nd Parfry Temp & Time | Final % Moisture | Final % Fat |
|---|---|---|---|---|---|
| Prethawed 30s | x | | 30 Sec at 370° F. | 62.69% | 8.87% |
| Prefrozen 30s | | x | 30 Sec at 370° F. | 63.86% | 9.31% |
| Prethawed 60s | x | | 60 Sec at 370° F. | 59.19% | 9.76% |
| Prefrozen 60s | | x | 60 Sec at 370° F. | 62.90% | 9.68% |
| Prethawed 90s | x | | 90 Sec at 370° F. | 60.35% | 9.82% |
| Prefrozen 90s | | x | 90 Sec at 370° F. | 62.92% | 9.68% |
| Prethawed 120s | x | | 120 Sec at 370° F. | 56.19% | 12.34% |
| Prefrozen 120s | | x | 120 Sec at 370° F. | 59.01% | 10.03% |
| Prethawed 150s | x | | 150 Sec at 370° F. | 56.54% | 10.63% |
| Prefrozen 120S | | x | 150 Sec at 370° F. | 59.07% | 10.25% |
| Prethawed 240s | x | | 240 Sec at 370° F. | 48.88% | 15.34% |
| Prefrozen 240s | | x | 240 Sec at 370° F. | 50.03% | 14.32% |

A review of Table A indicates several pertinent points.

The less refry residence time (30 seconds) the higher the moisture (lower solids) and less oil content. Basically, second-parfry residence time appears to be proportional to the solids and the oil, i.e. lower second-parfry residence time equates to lower solids and oil.

Within each test segment, percent moisture is less in the Prethawed sample of the present invention when compared to the Prefrozen sample, i.e. solids are higher in the Prethawed samples when compared to the Prefrozen samples.

Within each test segment, percent oil is usually higher in the Prethawed sample when compared to the Prefrozen sample (excluding the 30 second-parfry test result, which is probably attributable to experimental error).

Moisture decreases (solids increase) and oil increases as residence time increases, although a transition plateau appears between 90 and 120 seconds. This may be explained by its formation of a skin membrane, which may impede moisture removal and oil uptake. Apparently, a transition state is passed at about 150 second residence time, and moisture removal and oil uptake resume thereafter at increasing rates.

Conclusions i. As might be expected, Prethawed French fry products pick up more oil and lose more moisture (increase in solids) over a particular second-parfry residence time when compared to the Prefrozen French fry product.

ii. A transition plateau is reached at about 90 seconds. Above 150 seconds residence time, enough energy is provided to overcome the transition point and the oil and solids increase thereafter.

iii. There are certain processing advantages which result from using the Prethawed product of the present invention prior to the second-parfry step to include:
1. Energy savings in the fryer permit a proportional increase in volume capacity.
2. Moisture removal (solids increase) and oil uptake can be realized in a shorter second-parfry residence time, thereby enhancing the product color, minimizing excessive oil pick-up and quicker development of a textural crispy skin and dry, mealy internal texture.

Besides taste, the panel evaluated samples for textural characteristics using numbers 1 through 5 for separate rankings of skin or exterior texture and for internal fry texture as follows:

| Fry Strip Skin or Exterior | Fry Strip Interior |
|---|---|
| 1. Unacceptably limp or soggy | 1. Unacceptably wet or undercooked (fishy) |
| 2. Marginally crisp or or slightly limp | 2. Marginally wet or oily |
| 3. Preferred crispy (crunchy) | 3. Mealy and dry |
| 4. Marginally tough | 4. Marginal pull-away (hollow) |
| 5. Unacceptably dry and leathery | 5. Excessive pull-away (extreme hollow interior) |

The samples according to Table A were then reconstituted in a microwave oven using a paperboard carton with a susceptor plate.

External texture evaluation of the samples of Table A, as reconstituted in a microwave oven for 3 ½ minutes in a paperboard carton using a susceptor plate resulted in organoleptic mean scores of 2.0 and 3.66 for the Pre-frozen samples at 150 and 240 seconds (2nd parfry time) respectively. Comparison to the textural characteristic chart indicated that the Pre-frozen samples (prior art) were judged as marginally crisp/slightly limp or marginally tough exterior. Pre-thawed samples (current art of this invention) at 150 and 240 seconds demonstrated organoleptic results of preferred crispy external texture (2.42 and 3.0 mean scores respectively). Second parfry treatment of less than 120 seconds scored a lower mean value, i.e. limp and soggy.

The same panel evaluated the internal texture of the microwave reconstituted French fry samples of Table A. The samples were reconstituted for 3 and one-half minutes in a paperboard carton, using a susceptor plate, with the Prethawed fries of the present invention yielding scores of 2.916 i.e. texture characteristic of a preferred dry mealy interior. The second-parfry time was at 150 and 240 seconds. Second-parfry conditions of less than 120 seconds scored lower mean values. The Pre-frozen prior art products averaged a score at approximately 2.5 or 3.5 at a residence time for the second-parfry of 150 seconds and 240 seconds respectively. Taste panel characteristics equate the prior art samples (pre-frozen) at either wet and oily or excessively dry and hollow interiors.

A series of preliminary research tests were conducted and results are found in Table B. Briefly, this research investigated processing parameter limits, i.e. wet chemistry results including percent fat and moisture, evaluated optimum packaging design and calculated SAC number which relate mostly to the french fry surface area.

Statistical analysis of taste panel results and wet chemistry indicated

A—The optimum processing ranges are blanching at 16–23 minutes at 170° F., 1st parfry at 75–100 seconds at 365°–370° F. and a second parfry of 120–210 seconds;

B—The preferred packaging design to be a flexible packaging substrate (Kraft paperboard laminated with polyester) with a metal susceptor plate;

C—The SAC numbers (surface area calculation) relating to surface area had no correlation to taste panel results; and D—The preferred products as described above cored taste panel results of 2.96 to 3.12 i.e. preferred crispy exterior with a preferred dry mealy interior—Identifiers D, H2, K.

TABLE B

| Treatment Identifier | SAC Value | % Moisture Raw Potato | Water Blanch Temp & Time | Parfry Temp and Time | 2nd Parfry Temp & Time | Final % Moisture | Final % Fat |
|---|---|---|---|---|---|---|---|
| A | .35 | 79.5% | 23 minutes 170° F. | 100 seconds 365° F. | 240 seconds 360° F. | 52.9% | 11.0% |
| B | .33 | 79.3% | 10 minutes 170° F. | 100 seconds 365° F. | 150 seconds 360° F. | 55.2% | 12.2% |
| C | .45 | 8.09% | 23 minutes 170° F. | 100 seconds 365° F. | 290 seconds 360° F. | 51.6% | 12.3% |
| D | .42 | 81% | 23 minutes 170° F. | 100 seconds 365° F. | 210 seconds 360° F. | 52.0% | 11.6% |
| E | .27 | 81.3% | 23 minutes 165° F. | 100 seconds 365° F. | 150 seconds 360° F. | 60.2% | 9.6% |
| F | .39 | 80.9% | 10 minutes 170° F. | 340 seconds 365° F. | none | 53.2% | 8.9% |
| G | .20 | 81.9% | 23 minutes 170° F. | 40 seconds 370° F. | 120 seconds 370° F. | 63.5% | 8.3% |
| H-1 | NA | NA | 16 minutes 170° F. | 75 seconds 370° F. | 120 seconds 370° F. | 51.9% | 11.0% |
| H-2 | NA | NA | 16 minutes 170° F. | 75 seconds 370° F. | 120 seconds 370° F. | 56.1% | 8.9% |
| J | .32 | 79.8% | 23 minutes 170° F. | 75 seconds 370° F. | 120 seconds 370° F. | 56.4% | 11.0% |
| K | .37 | 79.9% | 23 minutes 170° F. | 75 seconds 370° F. | 180 seconds 370° F. | 54.7% | 11.2% |
| L | .37 | 79.9% | 23 minutes 170° F. | 75 seconds 370° F. | 120 seconds 370° F. | 53% | 10.5% |

What is claimed is:

1. A process for parfrying and freezing potato strips for subsequent microwave reconstitution or finish frying, prior to consumption, comprising the steps of:
   a. parfrying the potato strips a first time in hot oil;
   b. first freezing the once-parfried potato strips below 32° F.;
   c. thawing the once-parfried, frozen potato strips to a temperature above 32° F.;
   d. parfrying the thawed potato strips a second time in hot oil at a temperature of about 360° F. to about 385° F. for a period of about 150 seconds to about 240 seconds; and
   e. finally freezing and storing the twice-fried potato strips.

2. The process of claim 1 wherein the first parfrying step is preceded by a blanching step of from about 12 minutes to about 25 minutes at a temperature range of about 163° F.–180° F.

3. The process of claim 2 wherein the blanching step is carried out at 170° F. for 16 minutes.

4. The process of claim 1 wherein the first parfrying step is preceded by a blanching step at a temperature range of about 185° F. to about 205° F. for about 8 minutes to 15 minutes.

5. The process of claim 1, wherein a sugar dip of flume step occurs before the first parfry step.

6. The process of claim 5 wherein the sugar flume occurs at about 0.2 degrees brix to 1.2 degree brix at a temperature range of about 110° F. to about 180° F. for a period of about 10 seconds to about 50 seconds.

7. The process of claim 5, wherein the sugar flume occurs at about 0.6 degree brix, at about 168° F. for about 20 to about 25 second residence time.

8. The process of claim 1 wherein the first parfry step is carried out between about 40 seconds to about 120 seconds at about 360° F. to about 385° F.

9. The process of claim 1 wherein the first parfry step is at a temperature of about 370° F. for about 75 seconds.

10. The process of claim 1 wherein the first freeze step is a quick freeze of about 7 to about 30 minutes in a temperature range of about −20° F. to about −40° F.

11. The process of claim 1 wherein the first freeze is a quick freeze for about 20 minutes at a temperature of about −30° F.

12. The process of claim 1 wherein the thawing step occurs in the range of about 140° F. to about 200° F. in an air dryer for a period of about 3 minutes to about 6 minutes and with a bed face air velocity of about 300 feet per minute to about 500 feet per minute and with a bed depth of about 1 inch to about 4 inches.

13. The process of claim 1 wherein the thawing step comprises thawing previously parfried, frozen potatoes in an air dryer at about 170° F. for about 4 and one-half minutes with a bed face air velocity of about 450 feet per minute and a bed depth of about 2 inches.

14. The process of claim 1 wherein the second parfry occurs at about 375° F. for about 180 seconds.

15. The process of claim 1 wherein the final freeze step of the second parfried potato strips is in the range of about −20° F. to about 31 45° F. for a time of about 7 minutes to about 30 minutes.

16. The process of claim 1 wherein the final freezing step is a quick freeze of about 20 minutes at a temperature of about −30° F.

17. A process for preparing, reconstituting and finish frying frozen potato strips, comprising the steps of:

a. blanching potato strips using heated water as the blanching medium;
b. parfrying the potato strips a first time in hot oil;
c. reducing the temperature level of the once-parfried potato strips by freezing the strips;
d. thawing the once-parfried, frozen potato strips;
e. parfrying the thawed potato strips a second time in hot oil at a temperature of about 360° F. to about 385° F. for a period of about 150 seconds to about 240 seconds;
f. freezing the twice-parfried potato strips;
g. packaging and storing the frozen potato strips in containers which includes a susceptor plate; and
h. reconstituting the packaged, frozen potato strips in a microwave oven.

* * * * *